No. 743,094. PATENTED NOV. 3, 1903.
J. W. McAULIFFE.
SANITARY TRAP.
APPLICATION FILED MAR. 9, 1903.
NO MODEL.
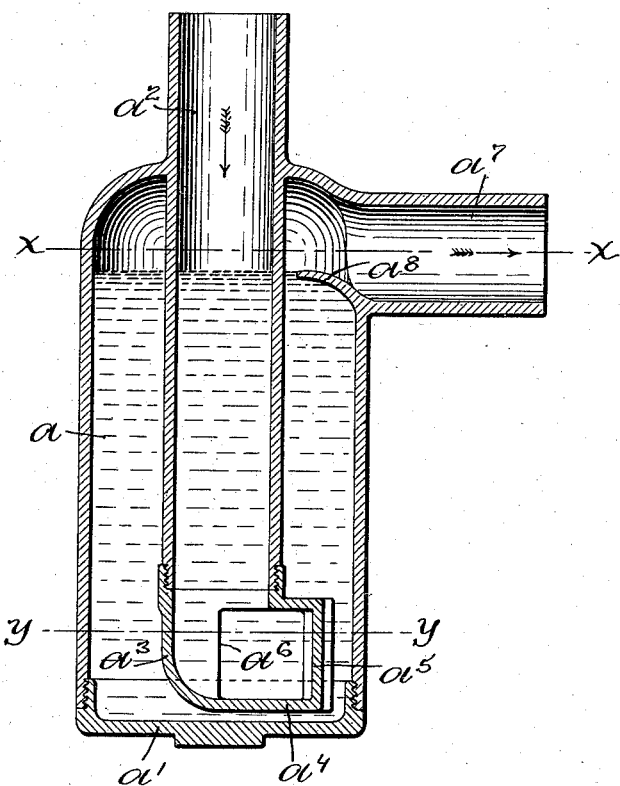
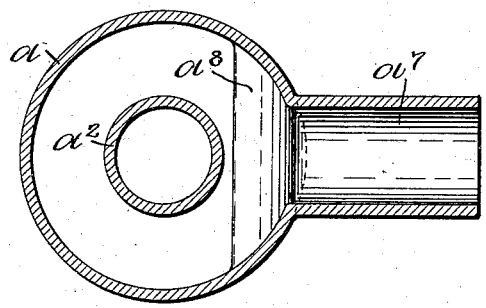
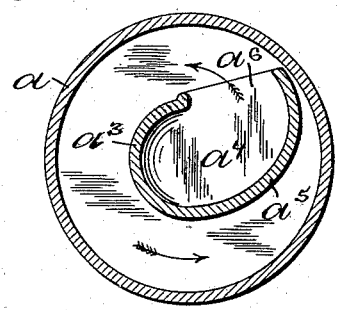
WITNESSES:
Chas. H. Luther Jr.
Ada E. Hagerty
INVENTOR:
John W. McAuliffe
By Joseph A. Miller & Co.
ATTORNEYS No. 743,094.

Patented November 3, 1903.

UNITED STATES PATENT OFFICE.

JOHN W. McAULIFFE, OF PROVIDENCE, RHODE ISLAND.

SANITARY TRAP.

SPECIFICATION forming part of Letters Patent No. 743,094, dated November 3, 1903.

Application filed March 9, 1903. Serial No. 146,862. (No model.)

*To all whom it may concern:*

Be it known that I, JOHN W. MCAULIFFE, a citizen of the United States, residing at Providence, in the county of Providence and State of Rhode Island, have invented a new and useful Improvement in Sanitary Traps, of which the following is a specification.

This invention has reference to an improvement in sanitary traps used to form a gas seal, and more particularly to an improvement in the inlet-duct in the trap.

In sanitary traps it has been found desirable to give a rotary or spiral motion to the fluid as it passes through the trap. This rotary or spiral motion scours the trap and assists in breaking the siphon, leaving a body of fluid sufficiently large to form a gas seal in the trap.

The objects of my invention are to simplify and construct a sanitary trap that will give a more perfect rotary or spiral movement to the fluid, more quickly break the siphon at the end of the flow, and leave a larger body of fluid in the trap to form a gas seal than has heretofore been done; and my invention consists in the peculiar and novel construction of the trap and the lower or outlet end of the inlet-duct in the trap for this purpose, as will be more fully described hereinafter, and pointed out in the claims.

Figure 1 is a vertical sectional view of my improved sanitary trap. Fig. 2 is a transverse sectional view, taken on line X X of Fig. 1, through the outlet-duct, and Fig. 3 is a transverse sectional view taken on line Y Y of Fig. 1 through the trap and deflector.

In the drawings, $a$ is the cylindrical body of my improved sanitary trap, having the detachable bottom or cover $a'$ in screw-thread engagement with the body of the trap $a$. The inlet-duct $a^2$, formed in one piece with the body $a$, extends downward and centrally through the top of the trap and into the body $a$ and has on its lower end the deflector $a^3$ in screw-thread engagement with the inlet-duct. The deflector $a^3$ is constructed to form the closed lower end $a^4$, the spirally-bent side wall $a^5$, and the outlet-opening $a^6$. Near the top of the trap and extending laterally from it is the outlet-duct $a^7$, formed in one piece with the body $a$, and extending across the body $a$ and the lower edge of the outlet-duct $a^7$ is the baffle-plate $a^8$ for retarding or holding a predetermined amount of fluid in the trap. The deflector $a^3$ is preferably secured to the inlet-duct $a^2$ near the bottom of the trap in a position to bring the outlet-opening $a^6$ under or nearly under the baffle-plate $a^8$, as shown in Fig. 1.

In the operation of my improved sanitary trap the fluid enters the inlet-duct $a^2$ and in its downward course strikes the closed end $a^4$ and the spirally-bent side wall $a^5$ of the deflector $a^3$ and enters the body of the trap through the outlet-opening $a^6$ with a rotary motion. The peculiar and novel form of the deflector on the end of the inlet-duct gives to the fluid a rotary or spiral motion in the trap around the inlet-duct, scouring the trap. The fluid now passes upward and over the baffle-plate $a^8$ and out of the trap through the outlet-duct $a^7$. The rotary or spiral motion given to the fluid in my improved trap assists in quickly breaking the siphon at the end of the flow, and the baffle-plate $a^8$ retards or holds a predetermined amount of the fluid to form a larger and more perfect gas seal than has heretofore been done.

Having thus described my invention, I claim as new and desire to secure by Letters Patent—

1. In a sanitary trap, a one-part cylindrical body having a detachable bottom or cover, a centrally-located inlet-duct extending downward through the top and into the body of the trap, an outlet-duct extending laterally from the trap near the top, an upwardly-extending shelf or baffle-plate near the outlet-duct, and a deflector on the inner end of the inlet-duct having a closed end, a spirally-bent side wall, and an outlet-opening to give a rotary or spiral motion to the fluid and to retard or hold a predetermined amount of the fluid in the trap, as described.

2. In a sanitary trap, the combination with the cylindrical body $a$ having the detachable bottom or cover $a'$ and the inlet-duct $a^2$, the deflector $a^3$ in screw-thread engagement with the inner end of the inlet-duct and having the closed lower end $a^4$, the spirally-bent side wall $a^5$, and the outlet-opening $a^6$, the outlet-duct $a^7$ extending laterally from the body near the top, and the upwardly-extending shelf or baffle-plate $a^8$ near the outlet-duct, all for the purpose as described.

In testimony whereof I have signed my name to this specification in the presence of two subscribing witnesses.

JOHN W. McAULIFFE.

Witnesses:
ADA E. HAGERTY,
JOS. A. MILLER, Jr.